UNITED STATES PATENT OFFICE.

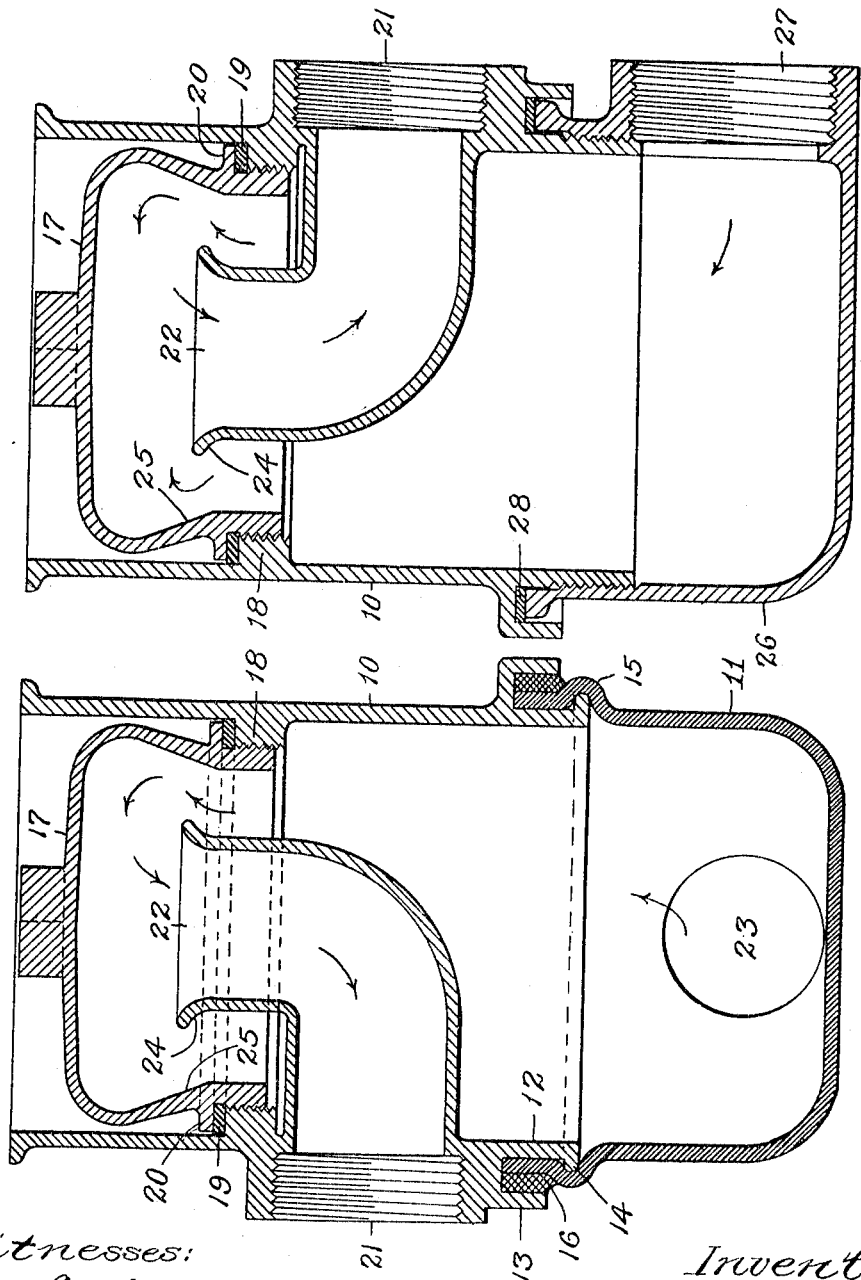

JOHN H. CARR, OF CHELSEA, MASSACHUSETTS.

TRAP.

1,114,858.      Specification of Letters Patent.      Patented Oct. 27, 1914.

Application filed April 5, 1911. Serial No. 619,025.

*To all whom it may concern:*

Be it known that I, JOHN H. CARR, of Chelsea, in the county of Suffolk and State of Massachusetts, have invented certain new and useful Improvements in Traps, of which the following is a specification.

The object of the present invention is to provide a trap suitable for use in connection with sinks and bathtubs.

One of the important features of a trap embodying the present invention is that it will not be emptied by siphonic action. The structural feature which prevents complete discharge of the trap is a reëntrant outlet having a mouth which extends upwardly above the inlet. The flow through the trap is upward from the inlet to the mouth of the outlet, and thence downward from the mouth to the outer end of the outlet. The mouth of the reëntrant outlet is preferably flared so as to deflect the liquid away from the mouth. The liquid is thus not only caused to flow upwardly and then downwardly in order to enter the outlet, but it is thrown laterally by the flaring mouth of the outlet before it passes downwardly into said mouth. This form and arrangement of the outlet is what prevents the discharge of the trap as the result of siphonic action.

Another feature of the invention is that the joint of the cleanout cap with the trap casing is below the normal level of liquid in the casing and is sealed by the liquid so as to prevent the escape of gas. The lower end of the cleanout cap is contracted in the horizontal plane of the flaring mouth of the outlet. The interior of the cap is thus adapted to coöperate with the exterior of the mouth of the outlet in preventing the discharge of the trap by siphonic action.

The main portion of the trap casing is preferably composed of brass. In a great many instances it is desirable to join with the trap an inlet pipe composed of lead. For this reason it is a custom to make what is called a wipe joint, and the present invention provides a trap casing of which the upper portion is composed of brass and the lower portion of lead. The trap casing may be installed before the lead inlet pipe is connected. After the lead inlet pipe is laid, an inlet port may be cut in the lead portion of the trap casing more readily than in the brass portion. The lead pipe may then be attached to the lead portion of the casing by the customary wipe joint. The improved feature of construction involved in the two-part casing is the means for making the joint between the lead portion and the brass portion. The lower end of the brass portion is formed with two annular flanges between which is a groove open at the bottom. At the lower extremity of the inner flange is a horizontal flange extending outwardly. The upper end of the lead portion is inserted into the groove between the two annular flanges and is afterward spun so as to closely fit the inner flange and to curve around the horizontal flange at the bottom of the inner flange. The joint is then completed by placing fusible metal in the annular space between the outer flange and the upper end of the lead portion. The fusible metal is locked in place by the projecting bead formed by the lead portion where the latter is seated upon the horizontal flange.

Of the accompanying drawings which illustrate two forms in which the invention may be embodied: Figure 1 represents a vertical section of the preferred form, composed of lead and brass. Fig. 2 represents a vertical section of a trap composed entirely of brass.

The same reference characters indicate the same parts wherever they occur.

The main part of the casing is indicated at 10. It is substantially cylindric, being initially open at the top and bottom. This portion of the casing is composed of relatively hard metal, such as brass. The lower portion 11 in the form shown by Fig. 1 is composed of relatively soft ductile metal, such as lead. The upper end of the section 11 is inserted between two annular flanges 12 and 13 at the bottom of the section 10. A flange 14 extends horizontally from the lower end of the flange 12. After the section 11 has been inserted between the flanges 12 and 13, it is spun so as to contract it against the flange 12 and to form a bead 15 embracing the flange 14. Suitable fusible metal 16 is afterward inserted between the upper end of the section 11 and the outer flange 13, said metal being held in place by the bead 15. The upper end of the casing is adapted to receive a cleanout cap 17. For this purpose the interior of the portion 10 is provided with a screw-threaded portion 18 with which the lower end of the cap is adapted to be engaged to form a joint. A gasket 19 is placed upon the upper surface of the portion 18 to form a resilient seat for a horizontal flange 20 formed on the cap. The upper end of the portion 10 is preferably extended above the top of the cap so as to protect the cap from injury. The top of the cap is therefore below the plane of the floor when the upper end of the casing is even with the plane of the floor.

The outlet is formed at 21 in the brass portion 10 and is provided with a reëntrant mouth 22 which extends upwardly into the cleanout cap and above the horizontal plane of the joint of the cap with the casing. In practice, the trap will be installed and may be joined with an outlet pipe before the inlet pipe is connected. The inlet pipe may approach the trap from any direction, and a suitable opening, such as that indicated at 23, may be cut in the lead portion 11 after the location of the inlet pipe is determined. The flow through the trap is upward from the inlet to the mouth of the outlet, and thence downward from the mouth of the outlet to the outer end of the outlet. This arrangement of the inlet and outlet prevents discharge of the trap by reason of siphonic action, but a smoother operation is made possible by flaring the mouth of the outlet as indicated at 24 and by contracting the cap as indicated at 25. The portions 24 and 25 are in the same horizontal plane, and they coöperate to cause the liquid to flow away from the mouth of the outlet before entering said mouth. The liquid, in passing between the reëntrant outlet and the cap 17, is deflected laterally by the flaring end of the outlet. The action of the flaring portion forms an air space which breaks the siphon, and the liquid thereafter settles in the casing sufficiently to seal the joint between the portion 10 and cap 17.

The trap shown by Fig. 2 embodies all the features shown by Fig. 1, with the exception of the lead portion 11. Instead of the lead portion, this form is provided with a detachable brass portion 26 whose inlet is indicated at 27. The portion 26 and the portion 10 are provided with coöperative screw-threads by which they are connected to hold the upper end of the portion 26 against a gasket 28. The advantage of having the brass portion 26 instead of the lead portion 11 is that the brass portion may be turned to any position with relation to the main body 10 of the casing, according to the direction from which the inlet pipe extends. The resilience of the gasket or packing 28 is sufficient to compensate for any inward or outward movement of the part 26 with relation to the part 10 within the range of movement of one turn of the part 26. The inlet 27 may be formed and screw-threaded for the reception of the inlet pipe before the trap is placed in the hands of the plumber who is going to install the same, because, as previously stated, the part 26 may be turned to any position desired.

I claim:

1. In combination, a tubular member of relatively soft pliable material having a reduced cylindric end portion and an internal annular shoulder defining the same, a tubular member of relatively hard material extending into said soft member through said reduced end portion and having a peripheral shoulder disposed behind said internal shoulder whereby said members are held connected, an annular body of packing material surrounding and embracing said reduced end portion, and annular means composed of relatively hard material surrounding and embracing said packing material, said annular means and said packing material being arranged to coact with said peripheral shoulder of said hard tubular member to lock said reduced portion of said soft tubular member upon said hard tubular member.

2. In combination, a tubular member of relatively soft pliable material and a tubular member of relatively hard material, one end portion of said soft member inclosing the opposite end portion of said hard member, said members having, respectively, an internal annular shoulder and an external annular shoulder, said shoulders being disposed one behind the other to hold said members connected, said soft member having a reduced cylindric extension inclosing said hard member behind said external shoulder of the latter, said hard member having a skirt portion surrounding said reduced extension, and an annular body of packing material inclosing said reduced extension and inclosed by said skirt portion, said skirt portion and said packing material being arranged to coact with said external shoulder to lock said reduced extension of said soft tubular member upon said hard tubular member.

3. In combination, a tubular member of relatively hard material having an external bead, a tubular member of relatively soft material fitting closely upon said hard member behind said bead and extending over and beyond said bead, a ring of packing material surrounding and fitting closely upon said closely fitting portion of said soft member behind said bead, and annular means of hard material surrounding and fitting closely upon said packing material behind said bead, whereby said packing material and said closely fitting portion of said soft member are locked against expanding.

In testimony whereof I have affixed my signature, in presence of two witnesses.

JOHN H. CARR.

Witnesses:
W. P. ABELL,
P. W. PEZZETTI.